US009379621B1

(12) United States Patent
Kalyanaranman et al.

(10) Patent No.: US 9,379,621 B1
(45) Date of Patent: Jun. 28, 2016

(54) DIGITAL SLOPE COMPENSATION FOR PEAK CURRENT CONTROLLED CONVERTERS

(71) Applicant: Microchip Technology Incorporated, Chandler, AZ (US)

(72) Inventors: Sabarish Kalyanaranman, Bangalore (IN); Ramesh Kankanala, Bangalore (IN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/607,684

(22) Filed: Jan. 28, 2015

(51) Int. Cl.
*G05F 1/00* (2006.01)
*H02M 3/335* (2006.01)

(52) U.S. Cl.
CPC ................... *H02M 3/33507* (2013.01)

(58) Field of Classification Search
CPC .. H02M 3/156; H02M 3/157; H02M 3/33507
USPC .................... 323/259, 282, 283, 285
See application file for complete search history.

(56) References Cited

U.S. PATENT DOCUMENTS

| 8,278,899 | B2 | 10/2012 | Schafmeister et al. | ....... 323/283 |
| 8,773,097 | B2* | 7/2014 | Franklin | ............... H02M 3/157 323/283 |
| 2009/0039852 | A1* | 2/2009 | Fishelov | ............... H02M 3/157 323/283 |
| 2011/0115458 | A1* | 5/2011 | Schafmeister | ........ H02M 3/156 323/284 |
| 2012/0176824 | A1 | 7/2012 | Franklin et al. | ................. 363/79 |
| 2014/0191743 | A1* | 7/2014 | O'Driscoll | ............ H02M 3/156 323/282 |
| 2014/0239922 | A1* | 8/2014 | Nene | ........................ G05F 1/10 323/234 |

OTHER PUBLICATIONS

Holme, P.R. et al., "Digital Control of High Frequency PWM Converters," Digital Controller Architecture, pp. 260-265 (6 pages) Jan. 1, 1993.
Grote, T. et al., "Adaptive Digital Slope Compensation for Peak Current Mode Control," Energy Conversion Congress and Exposition, IEEE, pp. 3523-3529 (7 pages) Sep. 20, 2009.
International Search Report and Written Opinion, Application No. PCT/US2016/015119, 16 pages Apr. 22, 2016.

* cited by examiner

*Primary Examiner* — Adolf Berhane
*Assistant Examiner* — Alex Torres-Rivera
(74) *Attorney, Agent, or Firm* — Slayden Grubert Beard PLLC

(57) ABSTRACT

A mixed signal integrated circuit, such as a typical microcontroller or digital signal controller (DSC), provides digital slope compensation for implementing peak current control in switched mode power supply (SMPS) systems. Simple and fast software calculations using digital values already measured require a single multiply and accumulate instruction (MAC) to determine the slope compensated peak current reference signal, $I_{CMP}$, that will be compared with the inductor/switch current to control power switch. Doing all calculations in digital form using a software program also allows easy configurability for many different applications, setting slope values by writing to a register(s) in a memory map, and to allow SMPS applications to be dynamically adaptable or configurable on the fly. The entire slope compensation function and PWM control may be self-contained within the microcontroller or DSC and without the need of external components.

23 Claims, 9 Drawing Sheets

DIGITAL SLOPE COMPENSATION FOR PEAK CURRENT CONTROLLED CONVERTERS

TECHNICAL FIELD

The present disclosure relates to peak current control for switched mode power supply (SMPS) applications, and in particular, to using digital slope compensation for the peak current control.

BACKGROUND

Peak current control is a popular control technique in switched mode power supply (SMPS) topologies such as buck, boost and buck-boost power converters and their derived topologies for improved dynamic response, greater noise rejection, flux balancing in magnetic components, cycle by cycle current limiting, and simplified load sharing between parallel connected SMPS equipment. A peak current controlled SMPS system typically has a compensator that generates a peak current reference signal. This signal is compared with a preprocessed inductor/switch current using a high speed analog comparator. The high speed analog comparator effectively controls a pulse width modulator (PWM) for the SMPS. When the preprocessed inductor/switch current exceeds the peak current reference signal (generated by the outer voltage compensator) the SMPS switch(es) is turned off. The SMPS power switch is turned on again after a programmed PWM switching period is completed, as a result of which a fixed frequency operation is achieved. The preprocessed inductor/switch current is nothing but the sensed inductor/switch current modified by a "slope compensation" ramp signal that modulates a downward slope onto the current reference value to stabilize the power circuit. The slope compensation ramp signal is necessary to implement the peak current control technique in SMPS topologies, since it eliminates sub-harmonic oscillations when the SMPS is operated at a PWM duty cycle of greater than fifty percent.

Digital Voltage Compensator with Analog Slope Compensation

Peak current control is typically an analog technique, implemented using linear amplifiers, e.g., analog operational amplifiers, digital flip-flops and analog comparators or by using dedicated Application Specific Integrated Circuits (ASICs). A popular method to implement the peak current control technique using a microcontroller involves replacing analog compensator with a digital compensator, thereby producing a "digital peak current reference signal." This digital peak current reference signal is coupled to an input of a digital-to-analog converter (DAC). The output of the DAC is an (negative) input to a built in high speed analog comparator. The preprocessed inductor/switch current (using external circuitry) is typically provided to the positive terminal of the built in high speed analog comparator. It is to be noted that the implementation of slope compensation using the external analog network circuitry poses reliability issues due to additional component requirements.

An alternative to the above method could be to continuously subtract a digital ramp signal from the digital peak current reference signal provided by the digital compensator. This would require very high speed interrupts to digital processor that may be several times the switching frequency of the converter. Such a requirement restricts the PWM switching frequency range and thus renders this method less feasible for commercial SMPS that typically run at high switching frequency, especially using low cost microcontrollers.

Yet another alternative could be to provide a dedicated core or peripheral inside the microcontroller that specifically performs this math operation without central processing unit (CPU) intervention. However this added peripheral function would increase microcontroller cost.

Digital Voltage Compensator with Digital Slope Compensation

To implement a digital peak current control solution comprising a digital compensator and digital slope compensation in combination with an analog comparator, a few methods have been proposed in literature and some have been patented. One of the patented methods involves cycle-by-cycle measurements of input and output voltages for computing a slope compensation factor (Ksc). A mathematical expression, which is a function of Ksc, measured inductor/switch current and the digital peak current reference are used in determining the digital slope compensated peak current reference. The digital slope compensated peak current reference is loaded into a high speed DAC and the analog output thereof is applied to an input of a high speed analog comparator. This mathematical expression may require two division instructions and two multiplication instructions along with a few addition and subtraction instructions, which is computationally intensive and requires a powerful digital processor to properly execute in the short time between PWM cycles. This all digital compensation method is more fully described in U.S. Pat. No. 8,278,899 B2, issued Oct. 2, 2012; entitled "Digital Slope Compensation for Current Mode Control," by Frank Schafmeister and Tobias Grote.

SUMMARY

Therefore, a need exists for implementation of peak current control without requiring a separate hardware module to do slope compensation, external analog components, or high computational throughput processing.

According to an embodiment, a method for providing slope compensation in a switched-mode power supply (SMPS) controller may comprise the steps of: turning on a PWM control signal at the beginning of a PWM cycle; sampling an input voltage ($v_{in}$) to a SMPS; converting the sampled input voltage ($v_{in}$) to a digital representation thereof ($V_{IN\_D}$); sampling an output voltage ($v_o$) from the SMPS; converting the sampled output voltage ($v_o$) to a digital representation thereof ($V_{OUT\_D}$); sampling an inductor current ($I_L$) of the SMPS when each pulse width modulation (PWM) signal turns on at a beginning of a PWM cycle, wherein the inductor current ($I_L$) may be at a minimum inductor current value ($I_V$); converting the sampled minimum inductor current ($I_V$) to a digital representation thereof ($I_{V\_D}$); determining a digital slope compensated peak current reference ($I_{CMP\_D}$) with a digital processor according to the steps of: determining A, where A may be a function of the digital representations of the sampled output voltage ($V_{OUT\_D}$) and the sampled input voltage ($V_{IN\_D}$), for a buck converter topology $$A = \frac{\beta V_{OUT\_D}}{(V_{IN\_D} - V_{OUT\_D} + \beta V_{OUT\_D})},$$

for a boost converter topology $$A = \frac{\beta(V_{OUT\_D} - V_{IN\_D})}{(V_{IN\_D} + \beta(V_{OUT\_D} - V_{IN\_D}))},$$

for a buck-boost converter topology $$A = \frac{\beta V_{OUT\_D}}{(V_{IN\_D} + \beta V_{OUT\_D})},$$

wherein $\beta$ may be within a range of $0.5 < \beta \le 1$, determining B, where B may be a function of the digital representations of the sampled output voltage ($V_{OUT\_D}$) and the sampled input voltage ($V_{IN\_D}$), for a buck converter topology $$B = \frac{(V_{IN\_D} - V_{OUT\_D})}{(V_{IN\_D} - V_{OUT\_D} + \beta V_{OUT\_D})},$$

for a boost converter topology $$B = \frac{V_{IN\_D}}{(V_{IN\_D} + \beta(V_{OUT\_D} - V_{IN\_D}))},$$

for a buck-boost converter topology $$B = \frac{V_{IN\_D}}{(V_{IN\_D} + \beta V_{OUT\_D})},$$

wherein $\beta$ may be within a range of $0.5 < \beta \le 1$, multiplying A with the digital minimum inductor current ($I_{V\_D}$), multiplying B with a digital control reference current ($I_{C\_D}$), and adding the results of the above two multiplication steps to determine the digital slope compensated peak current reference ($I_{CMP\_D} = A*I_{V\_D} + B*I_{C\_D}$); converting the digital slope compensated peak current reference ($I_{CMP\_D}$) to an analog slope compensated peak current reference ($I_{CMP}$) with a digital-to-analog converter (DAC); comparing the analog slope compensated peak current reference ($I_{CMP}$) to the inductor current ($I_L$) with an analog comparator; turning off the PWM control signal with an output from the analog comparator when the inductor current ($I_L$) may be substantially equal to the analog slope compensated peak current reference ($I_{CMP}$); and returning to the step of turning on the PWM control signal at the beginning of a next PWM cycle.

According to a further embodiment of the method, the step of determining the digital slope compensated peak current reference ($I_{CMP\_D}$) when $\beta$ may be equal to 1 may comprise the steps of: determining d, wherein for a buck converter topology $d = V_{OUT\_D}/V_{IN\_D}$,
for a boost converter topology $d = 1 - V_{IN\_D}/V_{OUT\_D}$, and
for a buck-boost converter topology $d = V_{OUT\_D}/(V_{IN\_D} + V_{OUT\_D})$;

multiplying d with the digital minimum inductor current ($I_{V\_D}$), multiplying (1−d) with the digital control reference current ($I_{C\_D}$), and adding the results of the above two multiplication steps to determine the digital slope compensated peak current reference ($I_{CMP\_D} = d*I_{V\_D} + (1-d)*I_{C\_D}$).

According to a further embodiment of the method, the digital control reference current ($I_{C\_D}$) may be determined by a digital compensator. According to a further embodiment of the method, the digital compensator may be selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

According to another embodiment, a method for providing slope compensation in a buck converter topology switched-mode power supply (SMPS) controller may comprise the steps of: turning on a PWM control signal at the beginning of a PWM cycle; sampling an input voltage ($v_{in}$) to a SMPS; converting the sampled input voltage ($v_{in}$) to a digital representation thereof ($V_{IN\_D}$); sampling an output voltage ($v_o$) from the SMPS; converting the sampled output voltage ($v_o$) to a digital representation thereof ($V_{OUT\_D}$); sampling an inductor current ($I_L$) of the SMPS when each pulse width modulation (PWM) signal turns on at a beginning of a PWM cycle, wherein the inductor current ($I_L$) may be at a minimum inductor current value ($I_V$); converting the sampled minimum inductor current ($I_V$) to a digital representation thereof ($I_{V\_D}$); determining a digital slope compensated peak current reference ($I_{CMP\_D}$) with a digital processor according to the steps of: determining A, where A may be a function of the digital representations of the sampled output voltage ($V_{OUT\_D}$) and the sampled input voltage ($V_{IN\_D}$), wherein $$A = \frac{\beta V_{OUT\_D}}{(V_{IN\_D} - V_{OUT\_D} + \beta V_{OUT\_D})}$$

and $\beta$ may be within a range of $0.5 < \beta \le 1$, determining B, where B may be a function of the digital representations of the sampled output voltage ($V_{OUT\_D}$) and the sampled input voltage ($V_{IN\_D}$), wherein $$B = \frac{(V_{IN\_D} - V_{OUT\_D})}{(V_{IN\_D} - V_{OUT\_D} + \beta V_{OUT\_D})}$$

and $\beta$ may be within a range of $0.5 < \beta \le 1$, multiplying A with the digital minimum inductor current ($I_{V\_D}$), multiplying B with a digital control reference current ($I_{C\_D}$), and adding the results of the above two multiplication steps to determine the digital slope compensated peak current reference ($I_{CMP\_D} = A*I_{V\_D} + B*I_{C\_D}$); converting the digital slope compensated peak current reference ($I_{CMP\_D}$) to an analog slope compensated peak current reference ($I_{CMP}$) with a digital-to-analog converter (DAC); comparing the analog slope compensated peak current reference ($I_{CMP}$) to the inductor current ($I_L$) with an analog comparator; turning off the PWM control signal with an output from the analog comparator when the inductor current ($I_L$) may be substantially equal to the analog slope compensated peak current reference ($I_{CMP}$); and returning to the step of turning on the PWM control signal at the beginning of a next PWM cycle.

According to a further embodiment of the method, the step of determining the digital slope compensated peak current reference ($I_{CMP\_D}$) when $\beta$ may be equal to 1 may comprise the steps of: determining d, wherein $d = V_{OUT\_D}/V_{IN\_D}$; multiplying d with the digital minimum inductor current ($I_{V\_D}$); multiplying (1−d) with the digital control reference current ($I_{C\_D}$); and adding the results of the above two multiplication steps to determine the digital slope compensated peak current reference ($I_{CMP\_D} = d*I_{V\_D} + (1-d)*I_{C\_D}$).

According to a further embodiment of the method, the digital control reference current ($I_{C\_D}$) may be determined by a digital compensator. According to a further embodiment of the method, the digital compensator may be selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

According to yet another embodiment, a method for providing slope compensation in a boost converter topology switched-mode power supply (SMPS) controller may comprise the steps of: turning on a PWM control signal at the beginning of a PWM cycle; sampling an input voltage ($v_{in}$) to a SMPS; converting the sampled input voltage ($v_{in}$) to a digital representation thereof ($V_{IN\_D}$); sampling an output voltage ($v_o$) from the SMPS; converting the sampled output voltage ($v_o$) to a digital representation thereof ($V_{OUT\_D}$); sampling an inductor current ($I_L$) of the SMPS when each pulse width modulation (PWM) signal turns on at a beginning of a PWM cycle, wherein the inductor current ($I_L$) may be at a minimum inductor current value ($I_V$); converting the sampled minimum inductor current ($I_V$) to a digital representation thereof ($I_{V\_D}$); determining a digital slope compensated peak current reference ($I_{CMP\_D}$) with a digital processor according to the steps of: determining A, where A may be a function of the digital representations of the sampled output voltage ($V_{OUT\_D}$) and the sampled input voltage ($V_{IN\_D}$), wherein $$A = \frac{\beta(V_{OUT\_D} - V_{IN\_D})}{(V_{IN\_D} + \beta(V_{OUT\_D} - V_{IN\_D}))}$$

and $\beta$ may be within a range of $0.5 < \beta \leq 1$, determining B, where B may be a function of the digital representations of the sampled output voltage ($V_{OUT\_D}$) and the sampled input voltage ($V_{IN\_D}$), wherein $$B = \frac{V_{IN\_D}}{(V_{IN\_D} + \beta(V_{OUT\_D} - V_{IN\_D}))}$$

and $\beta$ may be within a range of $0.5 < \beta \leq 1$, multiplying A with the digital minimum inductor current ($I_{V\_D}$); multiplying B with a digital control reference current ($I_{C\_D}$), and adding the results of the above two multiplication steps to determine the digital slope compensated peak current reference ($I_{CMP\_D} = A*I_{V\_D} + B*I_{C\_D}$); converting the digital slope compensated peak current reference ($I_{CMP\_D}$) to an analog slope compensated peak current reference ($I_{CMP}$) with a digital-to-analog converter (DAC); comparing the analog slope compensated peak current reference ($I_{CMP}$) to the inductor current ($I_L$) with an analog comparator; turning off the PWM control signal with an output from the analog comparator when the inductor current ($I_L$) may be substantially equal to the analog slope compensated peak current reference ($I_{CMP}$); and returning to the step of turning on the PWM control signal at the beginning of a next PWM cycle.

According to a further embodiment of the method, the step of determining the digital slope compensated peak current reference ($I_{CMP\_D}$) when $\beta$ may be equal to 1 may comprise the steps of: determining d, wherein $d = 1 - V_{IN\_D}/V_{OUT\_D}$; multiplying d with the digital minimum inductor current ($I_{V\_D}$); multiplying (1−d) with the digital control reference current ($I_{C\_D}$); and adding the results of the above two multiplication steps to determine the digital slope compensated peak current reference ($I_{CMP\_D} = d*I_{V\_D} + (1-d)*I_{C\_D}$).

According to a further embodiment of the method, the digital control reference current ($I_{C\_D}$) may be determined by a digital compensator. According to a further embodiment of the method, the digital compensator may be selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

According to still another embodiment, a method for providing slope compensation in a buck-boost converter topology switched-mode power supply (SMPS) controller may comprise the steps of: turning on a PWM control signal at the beginning of a PWM cycle; sampling an input voltage ($v_{in}$) to a SMPS; converting the sampled input voltage ($v_{in}$) to a digital representation thereof ($V_{IN\_D}$); sampling an output voltage ($v_o$) from the SMPS; converting the sampled output voltage ($v_o$) to a digital representation thereof ($V_{OUT\_D}$); sampling an inductor current ($I_L$) of the SMPS when each pulse width modulation (PWM) signal turns on at a beginning of a PWM cycle, wherein the inductor current ($I_L$) may be at a minimum inductor current value ($I_V$); converting the sampled minimum inductor current ($I_V$) to a digital representation thereof ($I_{V\_D}$); determining a digital slope compensated peak current reference ($I_{CMP\_D}$) with a digital processor according to the steps of: determining A, where A may be a function of the digital representations of the sampled output voltage ($V_{OUT\_D}$) and the sampled input voltage ($V_{IN\_D}$), wherein $$A = \frac{\beta V_{OUT\_D}}{(V_{IN\_D} + \beta V_{OUT\_D})}$$

and $\beta$ may be within a range of $0.5 < \beta \leq 1$, determining B, where B may be a function of the digital representations of the sampled output voltage ($V_{OUT\_D}$) and the sampled input voltage ($V_{IN\_D}$), wherein $$B = \frac{V_{IN\_D}}{(V_{IN\_D} + \beta V_{OUT\_D})}$$

and $\beta$ may be within a range of $0.5 < \beta \leq 1$, multiplying A with the digital minimum inductor current ($I_{V\_D}$); multiplying B with a digital control reference current ($I_{C\_D}$), and adding the results of the above two multiplication steps to determine the digital slope compensated peak current reference ($I_{CMP\_D} = A*I_{V\_D} + B*I_{C\_D}$); converting the digital slope compensated peak current reference ($I_{CMP\_D}$) to an analog slope compensated peak current reference ($I_{CMP}$) with a digital-to-analog converter (DAC); comparing the analog slope compensated peak current reference ($I_{CMP}$) to the inductor current ($I_L$) with an analog comparator; turning off the PWM control signal with an output from the analog comparator when the inductor current ($I_L$) may be substantially equal to the analog slope compensated peak current reference ($I_{CMP}$); and returning to the step of turning on the PWM control signal at the beginning of a next PWM cycle.

According to a further embodiment of the method, the step of determining the digital slope compensated peak current reference ($I_{CMP\_D}$) when $\beta$ may be equal to 1 may comprise the steps of: determining d, wherein $d = V_{OUT\_D}/(V_{IN\_D} + V_{OUT\_D})$; multiplying d with the digital minimum inductor current ($I_{V\_D}$); multiplying (1−d) with the digital control reference current ($I_{C\_D}$); and adding the results of the above two multiplication steps to determine the digital slope compensated peak current reference ($I_{CMP\_D} = d*I_{V\_D} + (1-d)*I_{C\_D}$).

According to a further embodiment of the method, the digital control reference current ($I_{C\_D}$) may be determined by a digital compensator. According to a further embodiment of the method, the digital compensator may be selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

According to the aforementioned embodiments, an apparatus using digital slope compensation for peak current control of a switched mode power supply (SMPS) may comprise: a digital processor and memory; a fast first sample and hold circuit having an input coupled to an inductor current measurement circuit for sampling inductor current of the SMPS; an analog multiplexer having a first input coupled to an input voltage ($V_{IN}$) to the SMPS, a second input coupled to an output voltage ($V_{OUT}$) from the SMPS, and a third input coupled to an output of the fast sample and hold circuit; a second sample and hold circuit having an input coupled to an output of the analog multiplexer; an analog-to-digital converter (ADC) having an input coupled to an output of the second sample and hold circuit and a digital output coupled to the digital processor; a digital-to-analog converter (DAC) having a digital input coupled to the digital processor; a fast analog comparator having a first input coupled to the inductor current measurement circuit and a second input coupled to an output of the DAC; and a pulse width modulation (PWM) generator coupled to the fast first sample and hold circuit and the fast analog comparator, wherein when an output of the PWM generator first turns on the fast first sample and hold circuit takes a sample of the inductor current from the inductor current measurement circuit, and when the inductor current from the inductor current measurement circuit may be substantially equal to a slope compensated peak current reference value ($I_{CMP}$) the PWM control signal may be turned off.

According to a further embodiment, the SMPS may comprise a buck converter topology. According to a further embodiment, the SMPS may comprise a converter boost topology. According to a further embodiment, the SMPS may comprise a buck-boost converter topology. According to a further embodiment, the SMPS may comprise a phase shifted full bridge converter topology. According to a further embodiment, the apparatus may comprise a microcontroller. According to a further embodiment, the apparatus may comprise a digital signal controller (DSC).

BRIEF DESCRIPTION OF THE DRAWINGS

A more complete understanding of the present disclosure may be acquired by referring to the following description taken in conjunction with the accompanying drawings wherein.

Figure 1:
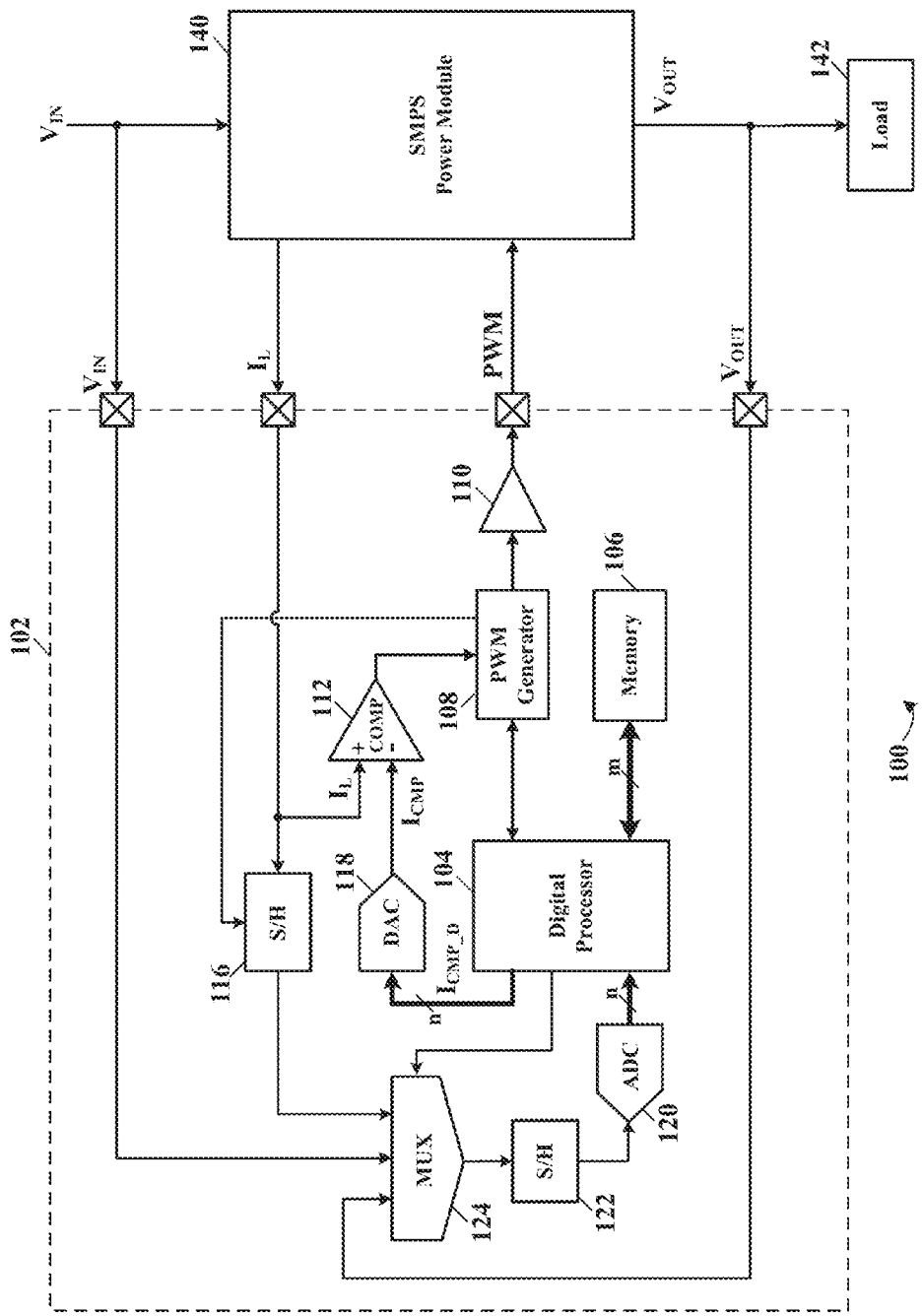
FIG. 1 illustrates a schematic block diagram of a mixed signal integrated circuit having fully digital peak current control with slope compensation for controlling a switched mode power supply (SMPS) module, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a software program in combination with a digital processor in a mixed signal integrated circuit may provide digital slope compensation for implementing peak current controlled SMPS systems, while having low latency and requiring minimal hardware and software resources. Using a microcontroller or digital signal controller (DSC) for providing digital slope compensation used with peak current control of a SMPS system allows configurability, setting slope value by writing to a register(s) in the microcontroller or SDC memory map, allowing the power supply application to be dynamically adaptable or configurable on the fly. The entire slope compensation function and PWM control may be self-contained within the microcontroller or DSC and without the need of external components. This enhanced functionality may be applied to any microcontroller or DSC controlled SMPS for example, but is not limited to, buck, boost, buck-boost or derivatives thereof. References to input voltage "$V_{IN}$" or "$v_{in}$," and output voltage "$V_{OUT}$" or "$v_o$" will be used interchangeable herein.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a mixed signal integrated circuit having fully digital peak current control with slope compensation for controlling a switched mode power supply (SMPS) module, according to a specific example embodiment of this disclosure. A mixed signal (analog and digital) microcontroller or digital signal controller (DSC) 102 provides for a fully digital peak current control implementation of a switched mode power supply system, generally represented by the numeral 100, without any external hardware required for the microcontroller or DSC 102. The microcontroller or DSC 102 may comprise a digital processor 104, a memory 106 coupled to the digital processor 104, a fast capture sample and hold circuit 116, an analog voltage comparator 112, PWM generator 108, a power transistor driver 110, a digital-to-analog converter (DAC) 118, an analog multiplexer 124 a general sample and hold circuit 122, and an analog-to-digital converter (ADC) 120. The microcontroller/DSC 102 may be coupled to and control a SMPS module 140 that supplies voltage and current (power) to a load 142.

The input voltage, $V_{IN}$, and output voltage, $V_{OUT}$, may be sampled through the multiplexer 124 and sample and hold circuit 122, then converted to digital representations thereof by the ADC 120. These input and output voltage digital representations may be coupled to the digital processor 104 for further processing. Typically, voltage sample timing is not critical as the input voltage, $V_{IN}$, and output voltage, $V_{OUT}$, do not change that quickly, e.g., much longer time than the PWM pulse period. However, in isolated topologies like the phase shifted full bridge converter, the input voltage may have to be sampled from the secondary side of the transformer (especially if the controller is placed in the secondary side). In such cases the input voltage sampling becomes timing critical and may also require fast capture sample and hold circuits.

The fast capture sample and hold circuit 116 may be used to capture valley currents, $I_V$, each time the output of the PWM generator turns ON (goes to a logic high). The PWM generator output turns ON at the start of a PWM cycle and at which time the inductor current, $I_L$, is at a minimum current value, $I_V$. The digital processor 104 ultimately generates a digital slope compensated peak current reference, $I_{CMP\_D}$. This digital slope compensated peak current reference, $I_{CMP\_D}$, is passed through a DAC 118 to convert the digital slope compensated peak current reference, $I_{CMP\_D}$, to an analog slope compensated peak current reference, $I_{CMP}$, and then to an input of the comparator 112. The comparator 112 compares the analog slope compensated current reference, $I_{CMP}$, to the PWM cycle inductor current, $I_L$, and causes the PWM generator 108 to turn off a power switch in the SMPS power module 140 when the inductor current, $I_L$, reaches substantially the same value as the analog slope compensated peak current reference, ICMP. This action prevents instability and sub-harmonic oscillations in the SMPS power module 140 when the PWM duty cycle is greater than 50 percent.

Figure 2:
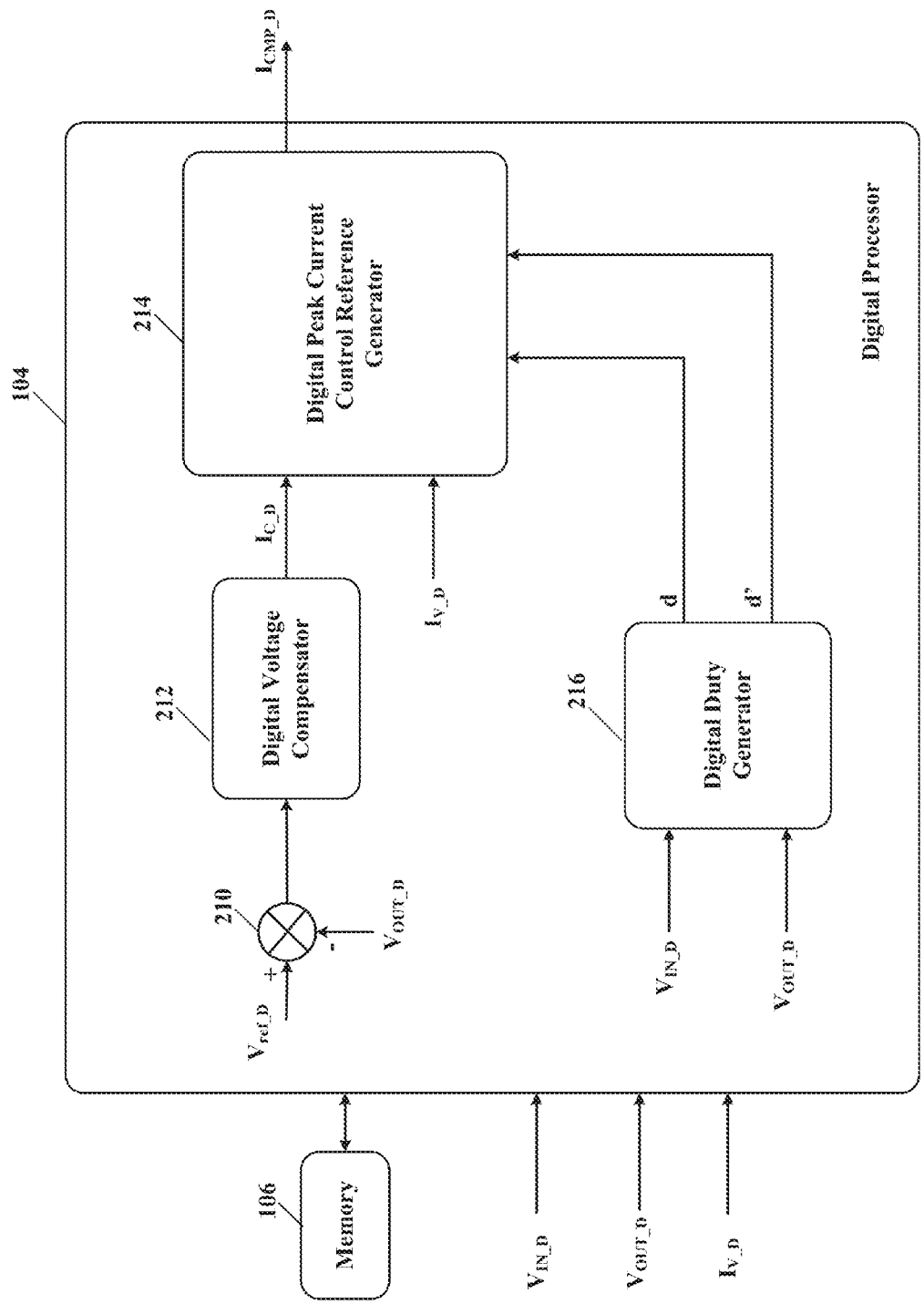
FIG. 2 illustrates a schematic block diagram of the digital control system implementation inside the digital processor, according to the specific example embodiment shown in FIG. 1.

Referring to FIG. 2, depicted is a schematic block diagram of the digital control system implementation inside the digital processor, according to the specific example embodiment shown in FIG. 1. The digitized sensed quantities $V_{IN\_D}$, $V_{OUT\_D}$, $I_{V\_D}$ along with the reference voltage $V_{REF\_D}$ (retrieved from the memory 106 in FIG. 1) form the inputs to the digital processor 104. A digital voltage error may be computed using a subtraction block 210. This error is fed to a digital voltage compensator 212. The digital voltage compensator 212 typically may comprise a difference equation implementation, e.g., one pole one zero, two pole two zero, three pole three zero, or a digital hardware based compensator. The coefficients of the difference equations may be determined by using digital control system design techniques in conjunction with the converter transfer functions. The converter transfer functions are derived using small signal modeling or other techniques for individual converters. In the case of a peak current controlled system the digital voltage compensator 212 may be designed to control the transfer function between the output voltage, $V_{OUT}$, and a peak current reference, $I_C$.

A digital uncompensated peak current reference signal, $I_{C\_D}$, may be determined by the digital voltage compensator 212. Simultaneously, the PWM duty d and complementary PWM duty d' are calculated by a digital duty generator 216 that uses the digital input voltage $V_{IN\_D}$ and the digital output voltage $V_{OUT\_D}$ as its inputs. The output of the digital voltage compensator 212 ($I_{C\_D}$) and the outputs from the digital duty generator block 216, (d and d') are fed to a digital peak current control reference generator 214 which generates the digital slope compensated peak current reference, $I_{CMP\_D}$. The digital voltage compensator 212 may comprise for example, but is not limited to, a one pole one zero low pass filter, a two pole two zero low pass filter, a three pole three zero low pass filter, a digital proportional-integral-derivative (PID) controller, a digital proportional-integral (PI) controller, any other suitable digital compensator or a digital hardware based compensator.

Figure 3:
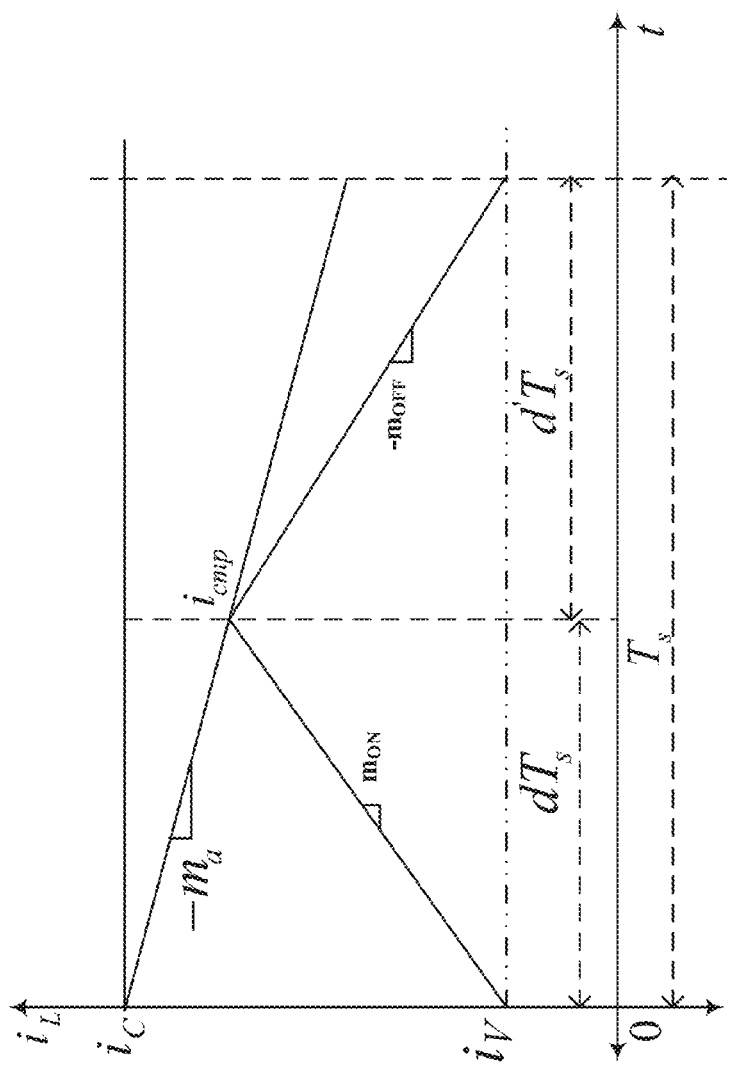
FIG. 3 illustrates a waveform of the inductor current for a single PWM cycle along with an uncompensated peak current reference and a slope compensation ramp waveform, according to the teachings of this disclosure.

Referring to FIG. 3, depicted is a waveform of the inductor current for a single PWM cycle along with an uncompensated peak current reference and a slope compensation ramp waveform, according to the teachings of this disclosure. The compensation ramp has a slope of $-m_a$. $I_V$ is the inductor valley current which occurs at the start of every PWM cycle. $I_C$ (in analog form) is the uncompensated peak current reference from the voltage compensator and $I_{CMP}$ ($i_{cmp}$) is the slope compensated peak current reference. It can be seen that $I_{CMP}$ occurs at the meeting point of the rising inductor current, $I_L$, and the compensation ramp subtracted from $I_C$. The inductor current rising slope (PWM—ON) is shown as $m_{ON}$ and the falling slope is shown as $—m_{OFF}$ (PWM—OFF). From FIG. 3 the following mathematical relationships may be derived:

$$i_C - m_a dT_s = i_{cmp} \tag{1}$$

$$i_V + m_{ON} dT_s = i_{cmp} \tag{2}$$

From equation (1)

$$d = (i_C - i_{cmp})\frac{1}{m_a T_s} \tag{3}$$

Substituting equation (3) into equation (2) and rearranging the terms would yield $$i_{cmp} = A i_V + B i_C \tag{4}$$

Where $A = \dfrac{m_a}{(m_{ON} + m_a)}$ and $B = \dfrac{m_{ON}}{(m_{ON} + m_a)}$ From the above expressions for the A and B terms, it can be shown that $$A+B=1 \tag{5}$$

This implies that if we determine A, then B can be determined by using $$B=1-A \tag{6}$$

It is known that $m_a > \tfrac{1}{2}(m_{OFF})$ and the optimum value of $m_a = m_{OFF}$
Thus $m_a$, preferably, would be within the range $$\tfrac{1}{2}(m_{OFF}) < m_a \le m_{OFF} \tag{7}$$

Dividing equation (7) by $m_{OFF}$ yields $$\dfrac{1}{2} < \dfrac{m_a}{m_{OFF}} \le 1 \tag{8}$$

If $m_a$ is varied as a proportion of $m_{OFF}$, then
Substituting equation (9) in equation (8) yields $$\tfrac{1}{2} < \beta \le 1 \tag{10}$$

From equation (10), β has the range (0.5,1]
Substituting equation (9) in the expression for A $$A = \dfrac{\beta m_{OFF}}{(m_{ON} + \beta m_{OFF})} \tag{11}$$

The following sections derive values of A and B for different SMPS topologies: For a buck converter, $$m_{ON} = \dfrac{v_{in} - v_o}{L} \text{ and } m_{OFF} = \dfrac{v_o}{L}.$$

Substituting expressions of $m_{ON}$ and $m_{OFF}$ in equation (11) yields A and B=1−A as $$A = \dfrac{\beta v_o}{(v_{in} - v_o + \beta v_o)} \tag{12}$$

$$B = \dfrac{(v_{in} - v_o)}{(v_{in} - v_o + \beta v_o)} \tag{13}$$

For a boost converter, $$m_{ON} = \dfrac{v_{in}}{L} \text{ and } m_{OFF} = \dfrac{v_o - v_{in}}{L}.$$

Substituting expressions of $m_{ON}$ and $m_{OFF}$ in equation (11) yields A and B=1−A as, $$A = \dfrac{\beta(v_o - v_{in})}{(v_{in} + \beta(v_o - v_{in}))} \tag{14}$$

$$B = \dfrac{v_{in}}{(v_{in} + \beta(v_o - v_{in}))} \tag{15}$$

For a buck-boost converter, $$m_{ON} = \dfrac{v_{in}}{L} \text{ and } m_{OFF} = \dfrac{v_o}{L}.$$

Substituting expressions of $m_{ON}$ and $m_{OFF}$ in equation (11) yields A and B=1−A as, $$A = \dfrac{\beta v_o}{(v_{in} + \beta v_o)} \tag{16}$$

$$B = \dfrac{v_{in}}{(v_{in} + \beta v_o)} \tag{17}$$

In all of the above three SMPS topologies, A and B are first determined then $I_{CMP}$ is determined by using the expression in equation (4). For the special case of optimal slope compensation where β=1, equations (12) through (17) would reduce to the form $$i_{cmp} = di_C + d'i_C \tag{18}$$

Where the values of d for buck, boost and buck-boost SMPS topologies are,
Buck converter:

$$d = \dfrac{v_o}{v_{in}} \tag{19}$$

Boost converter:

$$d = 1 - \dfrac{v_{in}}{v_o} \tag{20}$$

Buck Boost converter:

$$d = \dfrac{v_o}{(v_{in} + v_o)} \tag{21}$$

For achieving optimal slope compensation, the following instructions may be performed in the digital processor 104: one division instruction, one MAC (multiply-accumulate operation) instruction and up to two addition instructions.

From equation (18) it can be seen that the determination of the slope compensated peak current reference, $I_{CMP}$, is SMPS topology independent and does not require a specialized slope compensation module. Any standard microcontroller or DSC having analog inputs, an ADC, a DAC, and a comparator may be used to implement the teachings of this disclosure. Rapid sampling of only one input variable, inductor current, $I_L$, in determining $I_V$; along with only one multiply and accumulate (MAC) instruction are required to calculate the slope compensated peak current reference, $I_{CMP}$. The other variables: d and $I_{REF}$ are known from prior calculations based upon the measured input voltage, $V_{IN}$, and output voltage, $V_{OUT}$, that are much slower changing than are the PWM cycles.

Figure 4:
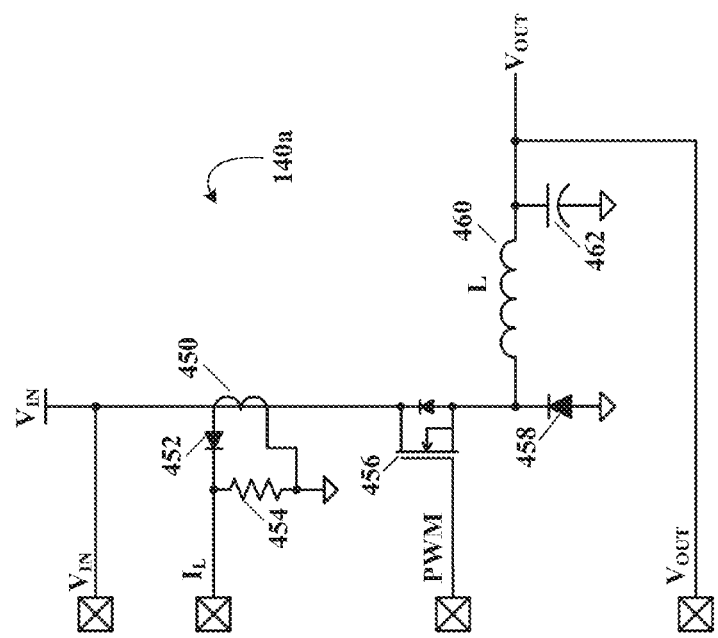
FIG. 4 illustrates a schematic diagram of a buck switched-mode converter module used in combination with the fully digital peak current controller having digital slope compensation, according to the specific example embodiment shown in FIG. 1.

Referring to FIG. 4, depicted is a schematic diagram of the buck switched-mode converter module used in combination with a peak current controlled converter having digital slope compensation, according to the specific example embodiment shown in FIG. 1. A buck converter, generally represented by the numeral 140a, can only produce lower average output voltage, $V_{OUT}$, than the input voltage, $V_{IN}$. In the buck converter 140a, a switch 456 (MOSFET) is placed in series with the input voltage source, $V_{IN}$. The input voltage source, $V_{IN}$, feeds the output (load 142 in FIG. 1) through the switch 456 and a low-pass filter, implemented with an inductor 460 and a capacitor 462. In a steady state of operation, when the switch 456 is ON for a period of $T_{ON}$, the input voltage source, $V_{IN}$, provides energy to the output (load 142) as well as to the inductor (L).

Figure 5:
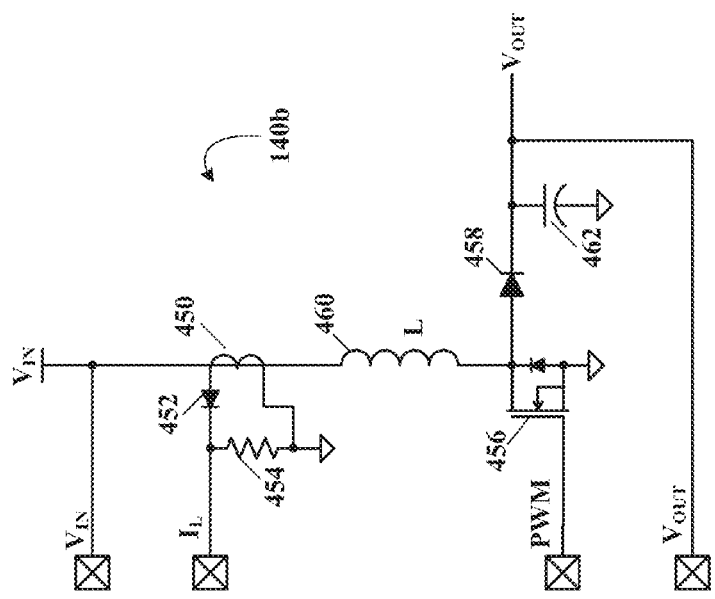
FIG. 5 illustrates a schematic diagram of a boost switched-mode converter module used in combination with the fully digital peak current controller having digital slope compensation, according to the specific example embodiment shown in FIG. 1.

Referring to FIG. 5, depicted is a schematic diagram of a boost switched-mode converter module used in combination with the fully digital peak current controller having digital slope compensation, according to the specific example embodiment shown in FIG. 1. A boost converter, generally represented by the numeral 140b, can only produce a higher output average voltage, $V_{OUT}$, than the input voltage source, $V_{IN}$. In the boost converter 140b, an inductor 460 is placed in series with the input voltage source, $V_{IN}$. The input voltage source, $V_{IN}$, feeds the output through the inductor 460, the diode 458 and capacitor 462.

Figure 6:
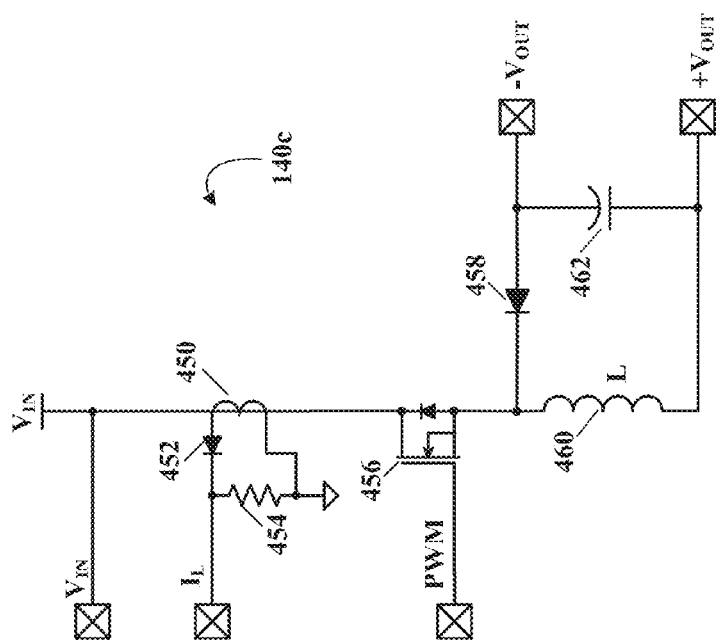
FIG. 6 illustrates a schematic diagram of a buck-boost switched-mode converter module used in combination with the fully digital peak current controller having digital slope compensation, according to the specific example embodiment shown in FIG. 1.

Referring to FIG. 6, depicted is a schematic diagram of a buck-boost switched-mode converter module used in combination with the fully digital peak current controller having digital slope compensation, according to the specific example embodiment shown in FIG. 1. A buck-boost converter, generally represented by the numeral 140c, can produce a higher or lower output average voltage, $V_{OUT}$, than the input voltage source, $V_{IN}$. When the switch 456 is turned ON, energy is stored in the inductor 460 and the load is supported by capacitor 462. When switch 456 is turned OFF, the stored energy in the inductor 460 is transferred to capacitor 462 and the load through diode 458.

Figure 7:
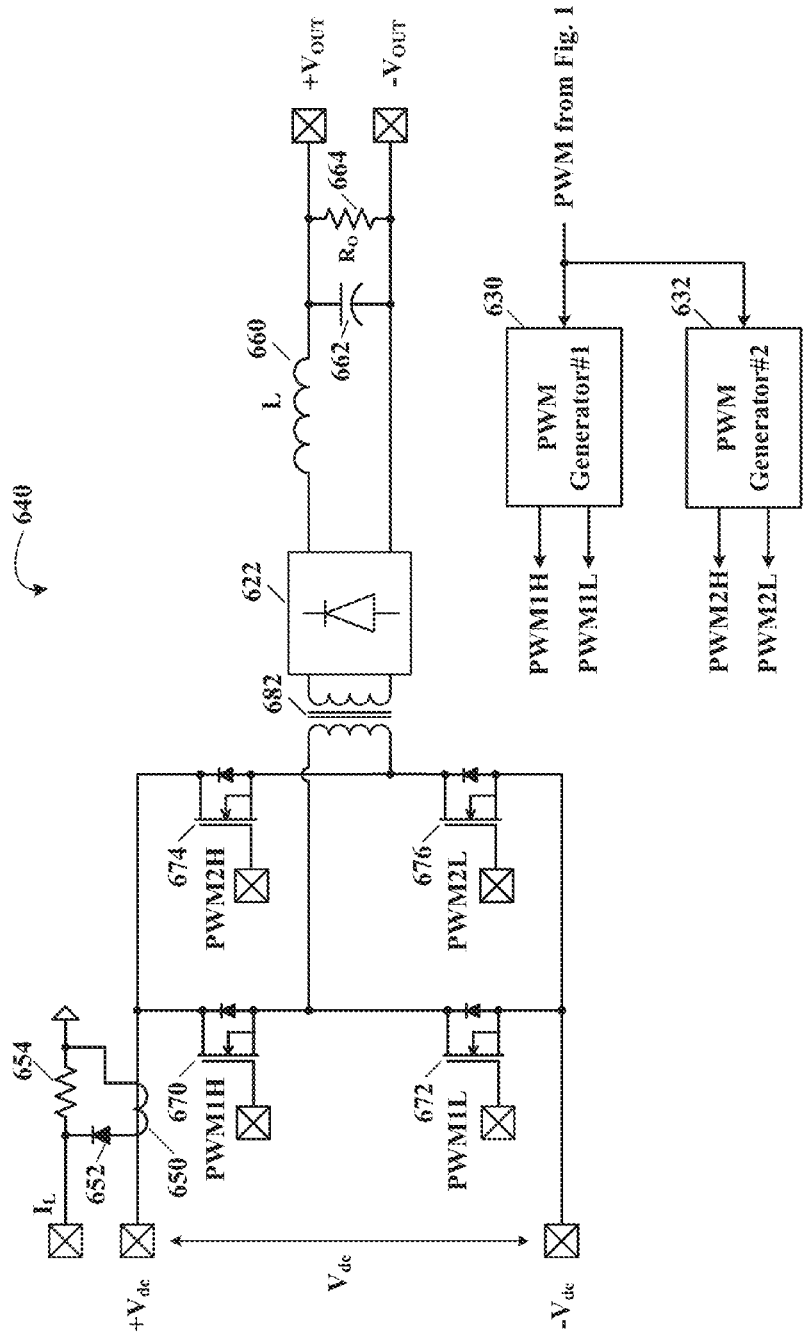
FIG. 7 illustrates a schematic block diagram of a phase-shifted full-bridge (PSFB) converter with a generic secondary rectifier block, running in complementary PWM mode and controlled by the fully digital peak current controller having digital slope compensation, according to the specific example embodiment shown in FIG. 1.

Referring to FIG. 7, depicted is a schematic block diagram of a phase-shifted full-bridge (PSFB) converter with a generic secondary rectifier block, running in complementary PWM mode and controlled by the fully digital peak current controller having digital slope compensation, according to the specific example embodiment shown in FIG. 1. A PSFB converter is generally represented by the numeral 640. The PSFB converter is a DC-DC converter which is widely used in commercially available server and telecom power supplies. The PSFB converter falls under the category of Buck derived topologies. Therefore, equation (18) has been used in conjunction with equation (19) for achieving digital peak current control with optimal slope compensation for this converter. The power switching transistors 670, 672, 674, and 676 are shown connected in an "H-bridge" configuration, controlled by PWM generators 630 and 632, and provide an alternating voltage to the primary of the transformer 682. The alternating voltage appearing in the secondary side of the transformer is passed through the rectifier block 622. This rectified voltage is filtered using a low pass filter comprising of an inductor 660 and a capacitor 662 before feeding to the load Ro 664. It is contemplated and within the scope of this disclosure that the rectifier module 622 could be configured a number of different ways, for example but not limited to, a full wave diode, center tapped full wave diode, full wave synchronous, center tapped full wave synchronous, current doubler, etc. The teachings of this disclosure have been successfully implemented in a PSFB converter with full wave center tapped synchronous rectification as shown in FIG. 8 more fully described hereinafter.

Figure 8:
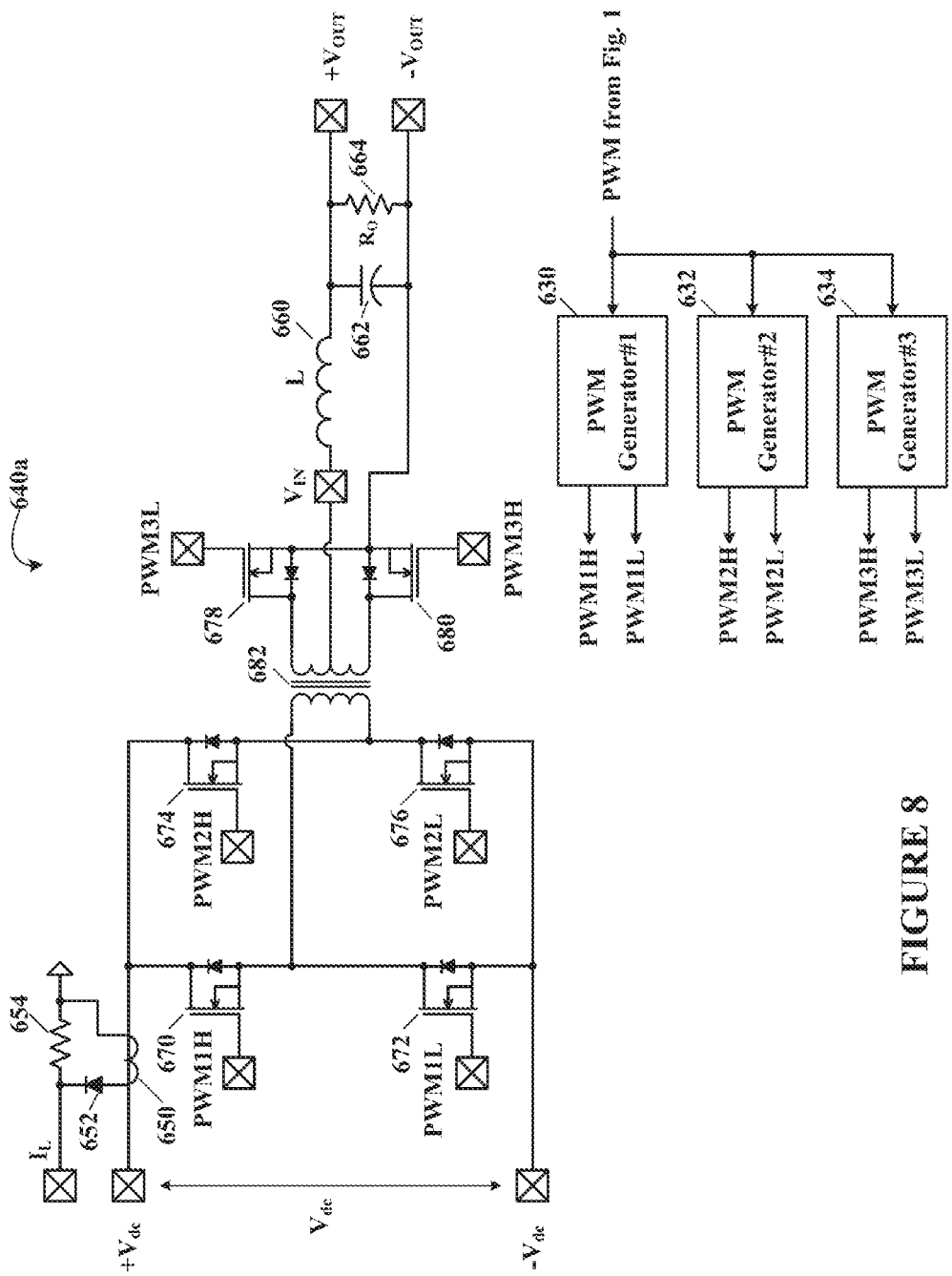
FIG. 8 illustrates a schematic block diagram of a PSFB converter with a center tapped secondary full wave synchronous rectification scheme, running in complementary PWM mode and controlled by the fully digital peak current controller having digital slope compensation, according to the specific example embodiment shown in FIG. 1.

Referring to FIG. 8, depicted is a schematic block diagram of a PSFB converter with a center tapped secondary full wave synchronous rectification scheme, running in complementary PWM mode and controlled by the fully digital peak current controller having digital slope compensation, according to the specific example embodiment shown in FIG. 1 The PSFB converter is controlled by a digital peak current controller having digital slope compensation, according to the specific example embodiment shown in FIG. 1. A PSFB converter with center tapped full wave synchronous rectification, is generally represented by the numeral 640a. The power switching transistors 670, 672, 674 and 676 are connected in an "H-bridge" configuration, controlled by PWM generators 630 and 632, and provide an alternating voltage to the primary of the transformer 682. The power switching transistors 678 and 680 are configured as a full-wave rectifier, controlled by PWM generator 634, and provide low loss rectification of the alternating voltage from the transformer 682 secondary winding. The rectified voltage is passed through a low pass filter comprising an inductor 660 and a capacitor 662 before being fed to the load Ro 664. The input voltage ($V_{IN}$) may be sensed at the center-tap point on the secondary side of the transformer. The output voltage ($V_{OUT}$) may be sensed directly at the output terminals. A reflection of the inductor current is sensed using a current transformer 650 on the primary side of the transformer 682 and is available in the form of a DC voltage across the load resistor 654 from rectifier 652.

Figure 9:
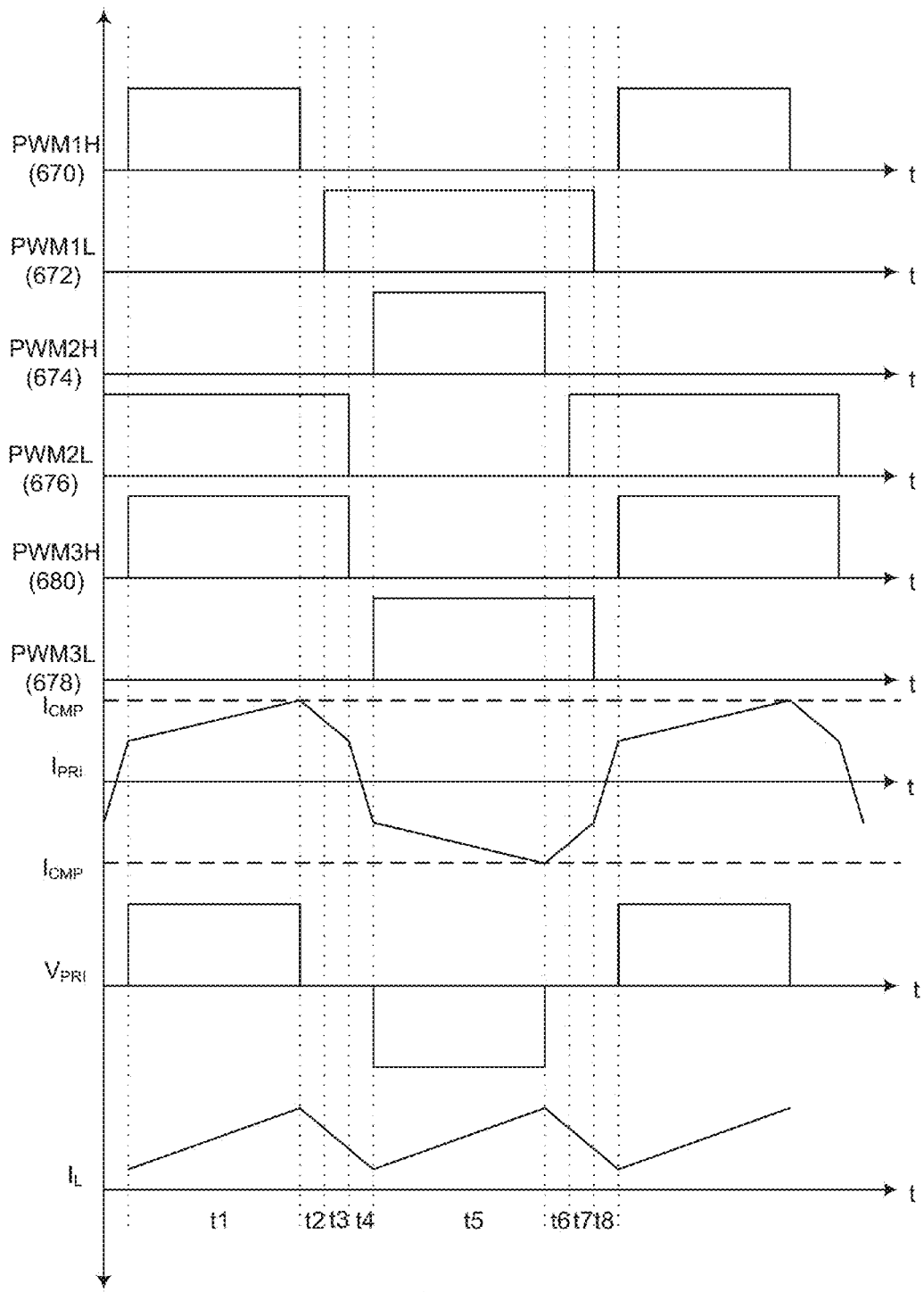
FIG. 9 illustrates a schematic timing diagram of the PWM switching waveforms for the PSFB converter shown in FIG. 8 along with the transformer current and voltage waveforms and the inductor current waveform, according to the teachings of this disclosure.

Referring to FIG. 9, depicted is a schematic timing diagram of the PWM switching waveforms for the PSFB converter shown in FIG. 8 along with the transformer current and voltage waveforms and the inductor current waveform, according to the teachings of this disclosure. $I_{PRI}$ is the transformer primary current and $I_L$ is the secondary side inductor current which is also a reflected and rectified version of the transformer primary current. $V_{PRI}$ is the primary side transformer voltage. The MOSFETs 670 and 672 in FIG. 8 are controlled by PWM signals PWM1H and PWM1L, respectively, with PWM generator 630. The MOSFETs 674 and 676 are controlled by PWM signals PWM2H and PWM2L, respectively, with PWM Generator 632. MOSFETs 680 and 678 are controlled by PWM signals PWM3H and PWM3L, respectively, with PWM generator 634. PWM generators 630, 632 and 634 run at fixed frequencies. PWM generators 630 and 632 are phase shifted with respect to each other by 180 degrees, while PWM generator 634 has the same phase as that of PWM Generator 630.

The positive half power delivery cycle t1 begins with the conduction of MOSFETs 670 and 676. When the primary current hits the slope compensated peak current reference, $I_{CMP}$, set by the digital peak current control, MOSFET 670 is turned OFF and after a short dead time t2 the complementary MOSFET 672 is turned ON. MOSFET 672 will remain on until the period of PWM generator 630 elapses. During time t3 the inductor current freewheels through the synchronous rectifier MOSFET 680 while the reflected primary current freewheels through MOSFETs 672 and 676. At the end of the positive half power delivery cycle MOSFET 676 is turned OFF and after a dead time t4, MOSFET 674 is turned ON starting the negative half power delivery cycle t5. When the primary current hits the slope compensated peak current reference, $I_{CMP}$, set by digital peak current control, MOSFET 674 turns OFF and after a dead time t6 MOSFET 676 turns ON. MOSFET 676 remains ON until the period of PWM generator 632 elapses. During the interval t7, the inductor current in the secondary side free wheels through MOSFET 678 while a reflection of this current free wheels through MOSFETs 672 and 676. At the end of t7, MOSFET 672 is turned OFF and after a dead time t8, MOSFET 670 turns ON restarting a new positive half power delivery cycle. On the secondary side, MOSFET 680 conducts during the positive half power delivery cycle from the start of the power delivery period up to end of the freewheeling period (t1 to t3), while MOSFET 678 conducts during the negative half power delivery cycle from the start of power delivery period up to end of freewheeling period (t5 to t7).

Figure 10:
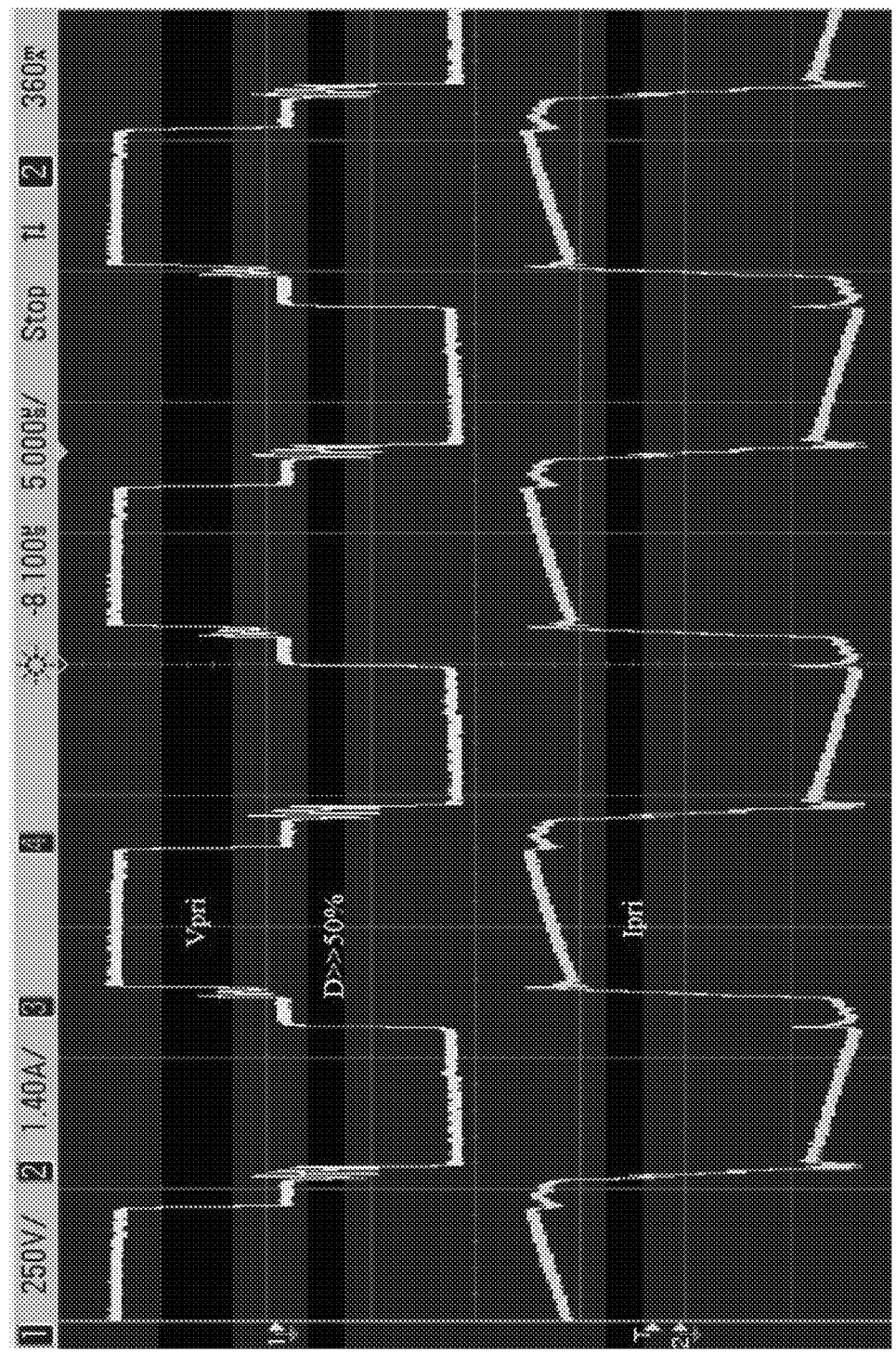
FIG. 10 illustrates oscilloscope waveforms captured from a PSFB test circuit as shown in FIG. 8, implementing a fully digital peak current control having digital slope compensation as depicted in FIG. 1, showing the transformer primary voltage and current waveforms indicative of stable converter operation, according to the teachings of this disclosure.

Referring to FIG. 10, depicted are oscilloscope waveforms captured from a PSFB test circuit as shown in FIG. 8, implementing a fully digital peak current control having digital slope compensation as depicted in FIG. 1, showing the transformer primary voltage and current waveforms indicative of stable converter operation, according to the teachings of this disclosure. A waveform of the primary current of transformer 682 in FIG. 8, $I_{PRI}$ along with the primary voltage $V_{PRI}$ obtained from a real time PSFB converter hardware that is controlled by using the digital peak current control with digital slope compensation, according to the teachings of this disclosure. The digital control has been implemented using a Microchip dsPIC DSC. It can be seen from the figure that the converter has a stable operation with a duty cycle of around 80% (>50%) using digital peak current control with digital slope compensation based upon the teachings of this disclosure.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for providing slope compensation in a switched-mode power supply (SMPS) controller, said method comprising the steps of:
   turning on a pulse width modulation (PWM) control signal at a beginning of a PWM cycle;
   sampling an input voltage ($v_{in}$) to a SMPS;
   converting the sampled input voltage ($v_{in}$) to a digital representation thereof ($V_{IN\_D}$);
   sampling an output voltage ($v_o$) from the SMPS;
   converting the sampled output voltage ($v_o$) to a digital representation thereof ($V_{OUT\_D}$);
   sampling an inductor current ($I_L$) of the SMPS when the PWM control signal turns on at the beginning of the PWM cycle, wherein the inductor current ($I_L$) is at a minimum inductor current value ($I_V$);
   converting the sampled minimum inductor current value ($I_V$) to a digital representation thereof ($I_{V\_D}$);
   determining a digital slope compensated peak current reference ($I_{CMP\_D}$) with a digital processor according to the steps of:
   determining A, where A is a function of the digital representations of the sampled output voltage ($V_{OUT\_D}$) and the sampled input voltage ($V_{IN\_D}$),
   for a buck converter topology $$A = \frac{\beta V_{OUT\_D}}{(V_{IN\_D} - V_{OUT\_D} + \beta V_{OUT\_D})},$$

for a boost converter topology $$A = \frac{\beta(V_{OUT\_D} - V_{IN\_D})}{(V_{IN\_D} + \beta(V_{OUT\_D} - V_{IN\_D}))},$$

for a buck-boost converter topology $$A = \frac{\beta V_{OUT\_D}}{(V_{IN\_D} + \beta V_{OUT\_D})},$$

wherein $\beta$ is within a range of $0.5 < \beta \leq 1$,
determining B, where B is a function of the digital representations of the sampled output voltage ($V_{OUT\_D}$) and the sampled input voltage ($V_{IN\_D}$),
for the buck converter topology $$B = \frac{(V_{IN\_D} - V_{OUT\_D})}{(V_{IN\_D} - V_{OUT\_D} + \beta V_{OUT\_D})}$$

for the boost converter topology $$B = \frac{V_{IN\_D}}{(V_{IN\_D} + \beta(V_{OUT\_D} - V_{IN\_D}))},$$

for the buck-boost converter topology $$B = \frac{V_{IN\_D}}{(V_{IN\_D} + \beta V_{OUT\_D})},$$

wherein $\beta$ is within the range of $0.5 < \beta \leq 1$,
multiplying A of any of the buck converter topology, the boost converter topology and the buck-boost converter topology with the digital minimum inductor current ($I_{V\_D}$),
multiplying B of any of the buck converter topology, the boost converter topology and the buck-boost converter topology with a digital control reference current ($I_{C\_D}$), and
adding results of the multiplying A and the multiplying B to determine the digital slope compensated peak current reference ($I_{CMP\_D} = A*I_{V\_D} + B*I_{C\_D}$);
converting the digital slope compensated peak current reference ($I_{CMP\_D}$) to an analog slope compensated peak current reference ($I_{CMP}$) with a digital-to-analog converter (DAC);
comparing the analog slope compensated peak current reference ($I_{CMP}$) to the inductor current ($I_L$) with an analog comparator;
turning off the PWM control signal with an output from the analog comparator when the inductor current ($I_L$) is substantially equal to the analog slope compensated peak current reference ($I_{CMP}$); and
returning to the step of turning on the PWM control signal at the beginning of a next PWM cycle.

2. The method according to claim 1, wherein the step of determining the digital slope compensated peak current reference ($I_{CMP\_D}$) when β is equal to 1 comprises the steps of:
   determining d, wherein
   for the buck converter topology d=$V_{OUT\_D}/V_{IN\_D}$,
   for the boost converter topology d=1−$V_{IN\_D}/V_{OUT\_D}$, and
   for the buck-boost converter topology d=$V_{OUT\_D}/(V_{IN\_D}+V_{OUT\_D})$;
   multiplying d with the digital minimum inductor current ($I_{V\_D}$),
   multiplying 1 minus d (1−d) with the digital control reference current ($I_{C\_D}$), and
   adding results of the multiplying d and the multiplying 1 minus d (1−d) to determine the digital slope compensated peak current reference ($I_{CMP\_D}$=d*$I_{V\_D}$+(1−d)*$I_{C\_D}$).

3. The method according to claim 1, wherein the digital control reference current ($I_{C\_D}$) is determined by a digital compensator.

4. The method according to claim 3, wherein the digital compensator is selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

5. An apparatus using digital slope compensation for peak current control of the switched mode power supply (SMPS) according to claim 1, comprising:
   a digital processor and memory;
   a fast first sample and hold circuit having an input coupled to an inductor current measurement circuit for sampling the inductor current of the SMPS;
   an analog multiplexer having a first input coupled to the input voltage ($V_{IN}$) of the SMPS, a second input coupled to the output voltage ($V_{OUT}$) from the SMPS, and a third input coupled to an output of the fast sample and hold circuit;
   a second sample and hold circuit having an input coupled to an output of the analog multiplexer;
   an analog-to-digital converter (ADC) having an input coupled to an output of the second sample and hold circuit and a digital output coupled to the digital processor;
   the digital-to-analog converter (DAC) having a digital input coupled to the digital processor;
   a fast analog comparator having a first input coupled to the inductor current measurement circuit and a second input coupled to an output of the DAC; and
   a pulse width modulation (PWM) generator coupled to the fast first sample and hold circuit and the fast analog comparator, wherein when an output of the PWM generator first turns on the fast first sample and hold circuit takes a sample of the inductor current from the inductor current measurement circuit, and when the inductor current from the inductor current measurement circuit is substantially equal to a value of the analog slope compensated peak current reference ($I_{CMP}$) the PWM control signal is turned off.

6. The apparatus according to claim 5, wherein the SMPS comprises a buck converter topology.

7. The apparatus according to claim 5, wherein the SMPS comprises a converter boost topology.

8. The apparatus according to claim 5, wherein the SMPS comprises a buck-boost converter topology.

9. The apparatus according to claim 5, wherein the SMPS comprises a phase shifted full bridge converter topology.

10. The apparatus according to claim 5, wherein the apparatus comprises a microcontroller.

11. The apparatus according to claim 5, wherein the apparatus comprises a digital signal controller (DSC).

12. A method for providing slope compensation in a buck converter topology switched-mode power supply (SMPS) controller, said method comprising the steps of:
   turning on a pulse width modulation (PWM) control signal at a beginning of a PWM cycle;
   sampling an input voltage ($v_{in}$) to a buck converter topology SMPS;
   converting the sampled input voltage ($v_{in}$) to a digital representation thereof ($V_{IN\_D}$);
   sampling an output voltage ($v_o$) from the SMPS;
   converting the sampled output voltage ($v_o$) to a digital representation thereof ($V_{OUT\_D}$);
   sampling an inductor current ($I_L$) of the SMPS when the PWM control signal turns on at the beginning of the PWM cycle, wherein the inductor current ($I_L$) is at a minimum inductor current value ($I_V$);
   converting the sampled minimum inductor current value ($I_V$) to a digital representation thereof ($I_{V\_D}$);
   determining a digital slope compensated peak current reference ($I_{CMP\_D}$) with a digital processor according to the steps of:
      determining A, where A is a function of the digital representations of the sampled output voltage ($V_{OUT\_D}$) and the sampled input voltage ($V_{IN\_D}$), wherein $$A = \frac{\beta V_{OUT\_D}}{(V_{IN\_D} - V_{OUT\_D} + \beta V_{OUT\_D})}$$

and β is within a range of 0.5<β≤1,
      determining B, where B is a function of the digital representations of the sampled output voltage ($V_{OUT\_D}$) and the sampled input voltage ($V_{IN\_D}$), wherein $$B = \frac{(V_{IN\_D} - V_{OUT\_D})}{(V_{IN\_D} - V_{OUT\_D} + \beta V_{OUT\_D})}$$

and β is within the range of 0.5<β≤1,
      multiplying A with the digital minimum inductor current ($I_{V\_D}$),
      multiplying B with a digital control reference current ($I_{C\_D}$), and
      adding results of the multiplying A and the multiplying B to determine the digital slope compensated peak current reference ($I_{CMP\_D}$=A*$I_{V\_D}$+B*$I_{C\_D}$);
   converting the digital slope compensated peak current reference ($I_{CMP\_D}$) to an analog slope compensated peak current reference ($I_{CMP}$) with a digital-to-analog converter (DAC);
   comparing the analog slope compensated peak current reference ($I_{CMP}$) to the inductor current ($I_L$) with an analog comparator;
   turning off the PWM control signal with an output from the analog comparator when the inductor current ($I_L$) is substantially equal to the analog slope compensated peak current reference ($I_{CMP}$); and
   returning to the step of turning on the PWM control signal at the beginning of a next PWM cycle.

13. The method according to claim 12, wherein the step of determining the digital slope compensated peak current reference ($I_{CMP\_D}$) when β is equal to 1 comprises the steps of:
  determining d, wherein $d=V_{OUT\_D}/V_{IN\_D}$;
  multiplying d with the digital minimum inductor current ($I_{V\_D}$);
  multiplying 1 minus d (1−d) with the digital control reference current ($I_{C\_D}$); and
  adding results of the multiplying d and the multiplying 1 minus d (1−d) to determine the digital slope compensated peak current reference ($I_{CMP\_D}=d*I_{V\_D}+(1-d)*I_{C\_D}$).

14. The method according to claim 12, wherein the digital control reference current ($I_{C\_D}$) is determined by a digital compensator.

15. The method according to claim 14, wherein the digital compensator is selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

16. A method for providing slope compensation in a boost converter topology switched-mode power supply (SMPS) controller, said method comprising the steps of:
  turning on a pulse width modulation (PWM) control signal at a beginning of a PWM cycle;
  sampling an input voltage ($v_{in}$) to a boost converter topology SMPS;
  converting the sampled input voltage ($v_{in}$) to a digital representation thereof ($V_{IN\_D}$);
  sampling an output voltage ($v_o$) from the SMPS;
  converting the sampled output voltage ($v_o$) to a digital representation thereof ($V_{OUT\_D}$);
  sampling an inductor current ($I_L$) of the SMPS when the PWM control signal turns on at the beginning of the PWM cycle, wherein the inductor current ($I_L$) is at a minimum inductor current value ($I_V$);
  converting the sampled minimum inductor current value ($I_V$) to a digital representation thereof ($I_{V\_D}$);
  determining a digital slope compensated peak current reference ($I_{CMP\_D}$) with a digital processor according to the steps of:
    determining A, where A is a function of the digital representations of the sampled output voltage ($V_{OUT\_D}$) and the sampled input voltage ($V_{IN\_D}$), wherein $$A = \frac{\beta(V_{OUT\_D} - V_{IN\_D})}{(V_{IN\_D} + \beta(V_{OUT\_D} - V_{IN\_D}))}$$

and β is within a range of 0.5<β≤1,
    determining B, where B is a function of the digital representations of the sampled output voltage ($V_{OUT\_D}$) and the sampled input voltage ($V_{IN\_D}$), wherein $$B = \frac{V_{IN\_D}}{(V_{IN\_D} + \beta(V_{OUT\_D} - V_{IN\_D}))}$$

and β is within the range of 0.5<β≤1,
    multiplying A with the digital minimum inductor current ($I_{V\_D}$);
    multiplying B with a digital control reference current ($I_{C\_D}$), and
    adding results of the multiplying A and the multiplying B to determine the digital slope compensated peak current reference ($I_{CMP\_D}=A*I_{V\_D}+B*I_{C\_D}$);
  converting the digital slope compensated peak current reference ($I_{CMP\_D}$) to an analog slope compensated peak current reference ($I_{CMP}$) with a digital-to-analog converter (DAC);
  comparing the analog slope compensated peak current reference ($I_{CMP}$) to the inductor current ($I_L$) with an analog comparator;
  turning off the PWM control signal with an output from the analog comparator when the inductor current ($I_L$) is substantially equal to the analog slope compensated peak current reference ($I_{CMP}$); and
  returning to the step of turning on the PWM control signal at the beginning of a next PWM cycle.

17. The method according to claim 16, wherein the step of determining the digital slope compensated peak current reference ($I_{CMP\_D}$) when β is equal to 1 comprises the steps of:
  determining d, wherein $d=1-V_{IN\_D}/V_{OUT\_D}$;
  multiplying d with the digital minimum inductor current ($I_{V\_D}$);
  multiplying 1 minus d (1−d) with the digital control reference current ($I_{C\_D}$); and
  adding results of the multiplying d and the multiplying 1 minus d (1−d) determine the digital slope compensated peak current reference ($I_{CMP\_D}=d*I_{V\_D}+(1-d)*I_{C\_D}$).

18. The method according to claim 16, wherein the digital control reference current ($I_{C\_D}$) is determined by a digital compensator.

19. The method according to claim 18, wherein the digital compensator is selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

20. A method for providing slope compensation in a buck-boost converter topology switched-mode power supply (SMPS) controller, said method comprising the steps of:
  turning on a pulse width modulation (PWM) control signal at a beginning of a PWM cycle;
  sampling an input voltage ($v_{in}$) to a buck-boost converter topology SMPS;
  converting the sampled input voltage ($v_{in}$) to a digital representation thereof ($V_{IN\_D}$);
  sampling an output voltage ($v_o$) from the SMPS;
  converting the sampled output voltage ($v_o$) to a digital representation thereof ($V_{OUT\_D}$);
  sampling an inductor current ($I_L$) of the SMPS when the PWM control signal turns on at the beginning of the PWM cycle, wherein the inductor current ($I_L$) is at a minimum inductor current value ($I_V$);
  converting the sampled minimum inductor current value ($I_V$) to a digital representation thereof ($I_{V\_D}$);
  determining a digital slope compensated peak current reference ($I_{CMP\_D}$) with a digital processor according to the steps of:
    determining A, where A is a function of the digital representations of the sampled output voltage ($V_{OUT\_D}$) and the sampled input voltage ($V_{IN\_D}$), wherein $$A = \frac{\beta V_{OUT\_D}}{(V_{IN\_D} + \beta V_{OUT\_D})}$$

and β is within a range of 0.5<β≤1,
determining B, where B is a function of the digital representations of the sampled output voltage ($V_{OUT\_D}$) and the sampled input voltage ($V_{IN\_D}$), wherein $$B = \frac{V_{IN\_D}}{(V_{IN\_D} + \beta V_{OUT\_D})}$$

and β is within the range of 0.5<β≤1,
multiplying A with the digital minimum inductor current ($I_{V\_D}$);
multiplying B with a digital control reference current ($I_{C\_D}$), and
adding results of the multiplying A and the multiplying B to determine the digital slope compensated peak current reference ($I_{CMP\_D} = A*I_{V\_D} + B*I_{C\_D}$);
converting the digital slope compensated peak current reference ($I_{CMP\_D}$) to an analog slope compensated peak current reference ($I_{CMP}$) with a digital-to-analog converter (DAC);
comparing the analog slope compensated peak current reference ($I_{CMP}$) to the inductor current ($I_L$) with an analog comparator;
turning off the PWM control signal with an output from the analog comparator when the inductor current ($I_L$) is substantially equal to the analog slope compensated peak current reference ($I_{CMP}$); and
returning to the step of turning on the PWM control signal at the beginning of a next PWM cycle.

21. The method according to claim 20, wherein the step of determining the digital slope compensated peak current reference ($I_{CMP\_D}$) when β is equal to 1 comprises the steps of:
determining d, wherein $d = V_{OUT\_D}/(V_{IN\_D} + V_{OUT\_D})$;
multiplying d with the digital minimum inductor current ($I_{V\_D}$);
multiplying 1 minus d (1−d) with the digital control reference current ($I_{C\_D}$); and
adding results of the multiplying d and the multiplying 1 minus d (1−d) to determine the digital slope compensated peak current reference ($I_{CMP\_D} = d*I_{V\_D} + (1-d)*I_{C\_D}$).

22. The method according to claim 20, wherein the digital control reference current ($I_{C\_D}$) is determined by a digital compensator.

23. The method according to claim 22, wherein the digital compensator is selected from the group consisting of a one pole one zero low pass filter, a two pole two zero low pass filter, a three pole three zero low pass filter, a digital proportional-integral-derivative (PID) controller, a digital proportional-integral (PI) controller, and a digital hardware compensator.

* * * * *